(12) United States Patent
Nakanishi et al.

(10) Patent No.: US 10,710,034 B2
(45) Date of Patent: Jul. 14, 2020

(54) METHOD FOR MIXING GAS INTO HIGH-VISCOSITY MATERIAL AND APPARATUS FOR THE SAME

(71) Applicant: SUNSTAR ENGINEERING INC., Osaka (JP)

(72) Inventors: Takayoshi Nakanishi, Mie (JP);
Toshifumi Yamashita, Mie (JP);
Takuro Omachi, Osaka (JP); Hiroyuki Nagata, Osaka (JP)

(73) Assignee: SUNSTAR ENGINEERING INC., Osaka (JP)

( * ) Notice: Subject to any disclaimer, the term of this patent is extended or adjusted under 35 U.S.C. 154(b) by 38 days.

(21) Appl. No.: 15/534,760

(22) PCT Filed: Feb. 5, 2016

(86) PCT No.: PCT/JP2016/053531
§ 371 (c)(1),
(2) Date: Jun. 9, 2017

(87) PCT Pub. No.: WO2016/125900
PCT Pub. Date: Aug. 11, 2016

(65) Prior Publication Data
US 2018/0264421 A1   Sep. 20, 2018

(30) Foreign Application Priority Data
Feb. 5, 2015   (JP) .................. 2015-020912

(51) Int. Cl.
*B01F 5/00*   (2006.01)
*B01F 5/04*   (2006.01)
(Continued)

(52) U.S. Cl.
CPC ........ *B01F 5/0486* (2013.01); *B01F 3/04446* (2013.01); *B01F 15/0237* (2013.01);
(Continued)

(58) Field of Classification Search
CPC .................. B01F 5/0486; B01F 3/04446; B01F 15/0237; B01F 15/0462; B01F 2015/0221;
(Continued)

(56) References Cited

U.S. PATENT DOCUMENTS 4,043,715 A * 8/1977 Hendry ............... B29C 44/3442
264/50
5,312,862 A   5/1994 Nielsen et al.
(Continued)

FOREIGN PATENT DOCUMENTS

JP    6-198152    7/1994
JP    7-96154     4/1995
(Continued)

OTHER PUBLICATIONS

International Search Report dated May 17, 2016 in International Application No. PCT/JP2016/053531.
(Continued)

*Primary Examiner* — Anshu Bhatia
(74) *Attorney, Agent, or Firm* — Wenderoth, Lind & Ponack, L.L.P.

(57) ABSTRACT

A gas mixing apparatus includes: a discharge port of gas provided near conduit space through which the high-viscosity material can flow; a piston pump including a cylinder that can communicate with the conduit space through the discharge port, a piston arranged inside the cylinder, and a drive device for moving the piston between a top dead center and a bottom dead center inside the cylinder; a discharge valve that opens and closes the discharge port; and a suction valve that opens and closes a suction port of the gas into a cylinder space, in which the cylinder forms the cylinder space having a predetermined volume when the piston is located at the top
(Continued)

dead center, and in which a tip of the piston approaches the discharge port when the piston is moved toward the bottom dead center.

8 Claims, 4 Drawing Sheets

(51) Int. Cl.
| | | |
|---|---|---|
| *B01F 15/02* | (2006.01) | |
| *B01F 15/04* | (2006.01) | |
| *B05B 7/00* | (2006.01) | |
| *B01F 3/04* | (2006.01) | |
| *B29C 44/34* | (2006.01) | |
| *B29B 7/74* | (2006.01) | |
| *B29B 7/76* | (2006.01) | |
| *B05B 7/26* | (2006.01) | |
| *B29K 63/00* | (2006.01) | |
| *B29K 27/06* | (2006.01) | |
| *B29K 75/00* | (2006.01) | |
| *B29K 105/04* | (2006.01) | |

(52) U.S. Cl.
CPC ........ *B01F 15/0462* (2013.01); *B05B 7/0025* (2013.01); *B29B 7/7409* (2013.01); *B29B 7/7419* (2013.01); *B29B 7/7626* (2013.01); *B29B 7/7642* (2013.01); *B29C 44/3446* (2013.01); *B01F 2015/0221* (2013.01); *B05B 7/267* (2013.01); *B29K 2027/06* (2013.01); *B29K 2063/00* (2013.01); *B29K 2075/00* (2013.01); *B29K 2105/04* (2013.01)

(58) Field of Classification Search
CPC ..... B05B 7/0025; B05B 7/267; B29B 7/7409; B29B 7/7419; B29B 7/7626; B29B 7/7642; B29C 44/3446; B29K 2027/06; B29K 2063/00; B29K 2075/00; B29K 2105/04

See application file for complete search history.

(56) References Cited

U.S. PATENT DOCUMENTS

| | | | |
|---|---|---|---|
| 6,602,063 B1 | 8/2003 | Cardona | |
| 2002/0132859 A1* | 9/2002 | Okuda | ............... B01F 3/04446 516/10 |
| 2013/0208561 A1* | 8/2013 | Cooke | .................. B01F 5/0471 366/348 |

FOREIGN PATENT DOCUMENTS

| | | |
|---|---|---|
| JP | 9-94450 | 4/1997 |
| JP | 10-506572 | 6/1998 |
| JP | 10-272344 | 10/1998 |
| JP | 10-337459 | 12/1998 |
| JP | 11-128709 | 5/1999 |
| JP | 2004-8846 | 1/2004 |
| JP | 2006-289276 | 10/2006 |
| WO | 96/09881 | 4/1996 |
| WO | 01/15880 | 3/2001 |

OTHER PUBLICATIONS

Extended European Search Report dated Sep. 22, 2017 in corresponding European patent application No. 16723239.6.
Extended European Search Report dated Mar. 21, 2019 in corresponding European Patent Application No. 18208758.5.

\* cited by examiner

METHOD FOR MIXING GAS INTO HIGH-VISCOSITY MATERIAL AND APPARATUS FOR THE SAME

TECHNICAL FIELD

The present invention relates to a method and an apparatus that mix gas into a high-viscosity material for the purpose of foaming the high-viscosity material, etc.

BACKGROUND ART

Conventionally, a plurality of methods or apparatuses have been disclosed for the purpose of manufacturing a foam gasket, etc. foamed by mixing gas into a pressurized high-viscosity material, and subsequently applying it under an atmospheric environment. For example, in Japanese Patent Laid-Open No. H10-272344, a method for mixing gas into a high-viscosity material has been disclosed in which using a piston pump in which a piston reciprocates in a cylinder to perform a suction stroke and a discharge stroke, the gas is supplied in the cylinder in the suction stroke of the piston pump, the piston reaches a suction end, the suction stroke ends, and an inside of the cylinder becomes a state of being filled with the gas having an adjusted pressure, and subsequently, the high-viscosity material is supplied in the cylinder, the discharge stroke of the piston pump is performed after end of the supply of the high-viscosity material, and in which the gas and the high-viscosity material are discharged to a conduit in the discharge stroke.

In addition, in Japanese Patent Laid-Open No. H09-94450, there has been disclosed a method for mixing gas into a fluid material having the steps of: alternately sending out the fluid material and the gas through the same path by a comparatively low pressure of approximately 1 to 5 kg/cm$^2$; and pressurizing the fluid material and the gas to a high pressure of approximately 100 to 400 kg/cm$^2$ by a high-pressure pump in the middle of the path.

CITATION LIST

Patent Literature

Patent Literature 1: Japanese Patent Laid-Open No. H10-272344
Patent Literature 2: Japanese Patent Laid-Open No. H09-94450

SUMMARY OF INVENTION

Technical Problem

However, in a technology disclosed in Patent Literature 1, there has been a problem that three strokes of the suction stroke of the gas, a supply stroke of the high-viscosity material, and the discharge stroke of the gas and the high-viscosity material are needed for mixing the gas into the high-viscosity material, and that a time of an operation cycle is long.

In addition, in a technology disclosed in Patent Literature 2, when a high-viscosity material is used for the fluid material, pumping the fluid material and the gas in the path might take a long time in a first-half step of alternately sending them out by the comparatively low pressure.

In addition, in the technologies disclosed in Patent Literature 1 and 2, a valve mechanism for supplying the high-viscosity material or the fluid material in the piston pump, and further, a mechanism that determines whether or not a prescribed amount of the high-viscosity material or the fluid material has been accurately supplied to the piston pump are needed in order to supply the high-viscosity material or the fluid material in the piston pump. Further, when a foam ratio of the high-viscosity material or the fluid material is set to be a ratio other than twice in order to supply the high-viscosity material or the fluid material, and the gas in the same piston pump, a mechanism for supplying the gas in a negative-pressure state or after being pressurized is essential.

The present invention has been made in view of the above-described points, and an object thereof is to provide a method and an apparatus that can mix gas into a high-viscosity material by a simple method and configuration.

Solution to Problem

In order to solve the above-described problems, a method for mixing gas into a high-viscosity material of the present invention includes the steps of: closing a discharge port provided so as to make a cylinder communicate with a conduit through which the high-viscosity material can flow; moving away a piston arranged inside the cylinder from the discharge port to form a cylinder space having a predetermined volume in the cylinder; filling the cylinder space with gas having a predetermined pressure; moving the piston toward the discharge port to compress the gas; and opening the discharge port to mix the compressed gas into the high-viscosity material that flows through the conduit.

According to the present invention, by opening the discharge port for making the cylinder communicate with the conduit, the gas having the predetermined pressure stored in the cylinder space having the predetermined volume can be discharged from the discharge port, and the gas can be mixed into the high-viscosity material that has flowed through the conduit.

In a preferred aspect of the present invention, the series of steps from closing the discharge port to opening the discharge port is repeated each time when a predetermined amount of the high-viscosity material flows. According to the aspect, since an amount of the gas mixed into the high-viscosity material and an amount of the high-viscosity material can be accurately controlled, a foam ratio of the high-viscosity material can be accurately maintained. In addition, it becomes possible to continuously supply to a subsequent step the high-viscosity material into which the gas has been mixed. Here, it goes without saying that "each time when the predetermined amount of the high-viscosity material flows" includes "each time when the predetermined amount of the high-viscosity material flows through conduit space". In addition, "each time when the predetermined amount of the high-viscosity material flows" also includes a case where the predetermined amount of the high-viscosity material is discharged or flows in a pipe communicating with the conduit space, etc., even in a state where the high-viscosity material does not flow in the conduit space or in a state where the predetermined amount of the high-viscosity material does not flow therein.

In the aspect, more preferably, it becomes possible to easily and accurately control the foam ratio of the high-viscosity material by adjusting at least any one of the predetermined amount of the high-viscosity material, the predetermined volume of the cylinder space, and the predetermined pressure of the gas.

In another preferred aspect of the present invention, a tip of the piston fits without a gap to an inside of an end of the cylinder in which the discharge port has been formed, at a termination of the operation in which the piston is moved toward the discharge port. According to the aspect, since dead space in the cylinder can be set to be substantially zero, the gas mixed into the high-viscosity material can be measured more accurately.

In the method of the present invention, for example, the discharge port is provided so as to face a flow of the high-viscosity material in a side wall of the conduit, and the step of closing the discharge port can be set to be a step of extending a valve body from a position of the side wall of the conduit, and seating the valve body at the discharge port, the position being opposed to the discharge port.

In addition, a suction port is provided in a side wall of the cylinder that forms the cylinder space, and a step of filling the cylinder space with the gas having the predetermined pressure can be set to be a step of seating the valve body at the suction port from an outside of the cylinder space after introducing the gas from the suction port.

In addition, in order to solve the above-described problems, a gas mixing apparatus of the present invention is configured to include: a piston pump including a cylinder, a gas discharge port formed at an end of the cylinder so as to make the cylinder communicate with a conduit through which a high-viscosity material can flow, a suction port formed in the cylinder so as to fill the cylinder with gas, and a piston slid between a first position and a second position inside the cylinder; and a discharge valve that opens and closes the discharge port, in which the cylinder forms a cylinder space having a predetermined volume when the piston is located at the first position.

According to the gas mixing apparatus of the present invention, the high-viscosity material can be pumped by a pump other than the piston pump that compresses the gas, and the piston pump can be used only for mixing the gas into the high-viscosity material. In addition, similarly, since another pump is used for pumping the high-viscosity material, the high-viscosity material can be continuously supplied. Further, the number of valve mechanisms that are provided at the piston pump and require high accuracy can be decreased, and structure of the gas mixing apparatus can be made simple.

A preferred gas mixing apparatus of the present invention is controlled to execute each of the steps of: closing the discharge valve; moving the piston to the first position to form the cylinder space having the predetermined volume; filling the cylinder space with the gas having the predetermined pressure from the suction port; moving the piston toward the second position to compress the gas; and opening the discharge valve to mix the compressed gas into the high-viscosity material that flows through the conduit space.

Preferably, the series of steps from closing the discharge valve to opening the discharge valve is repeated each time when a predetermined amount of the high-viscosity material flows. As described above, since the piston pump compresses only the gas, a foam ratio of the high-viscosity material can be set over a wide range by changing the number of operations of the piston pump within a predetermined time (for each predetermined flow rate of the high-viscosity material).

Further, the foam ratio of the high-viscosity material can be controlled by adjusting at least any one of the predetermined amount of the high-viscosity material, the predetermined volume of the cylinder space, and the predetermined pressure of the gas.

In a case where the predetermined volume of the cylinder space is adjusted in order to control the foam ratio of the high-viscosity material, for example, the piston may be controlled so as to change the first position.

In a more preferred aspect, when the piston is located at the second position, a tip of the piston fits to an inside of the end of the cylinder. In this case, the tip of the piston preferably has a shape complementary to the inside of the end of the cylinder in which the discharge port has been formed. According to the aspect, since dead space in the cylinder of the piston pump can be set to be substantially zero, the gas mixed into the high-viscosity material can be measured more accurately.

In the gas mixing apparatus of the present invention, for example, the discharge port may be provided so as to face a flow of the high-viscosity material in a side wall of the conduit, and the discharge valve may include a valve body that can extend from a position of the side wall of the conduit to seat at the discharge port, the position being opposed to the discharge port.

In the gas mixing apparatus of the present invention, for example, the suction port may be provided in the side wall of the cylinder that forms the cylinder space, and the suction valve may include a valve body that can extend from an outside of the cylinder space to seat at the suction port.

The preferred valve body is a needle.

The gas mixing apparatus of the present invention can be, for example, configured such that the discharge port is provided facing the conduit space inside the conduit, and such that at least a part of the cylinder space that communicates with the discharge port is formed in the conduit.

According to the apparatus for mixing the gas into the high-viscosity material, and the preferred examples thereof of the present invention, practical effects similar to the above-mentioned method for mixing the gas into the high-viscosity material of the present invention can be obtained.

DESCRIPTION OF EMBODIMENTS

Hereinafter, an embodiment of an apparatus for mixing gas into a high-viscosity material of the present invention will be explained in detail with reference to accompanying drawings. Note that a method for mixing gas into a high-viscosity material of the present invention is carried out using the apparatus for mixing the gas into the high-viscosity material of the present invention.

Figure 1:
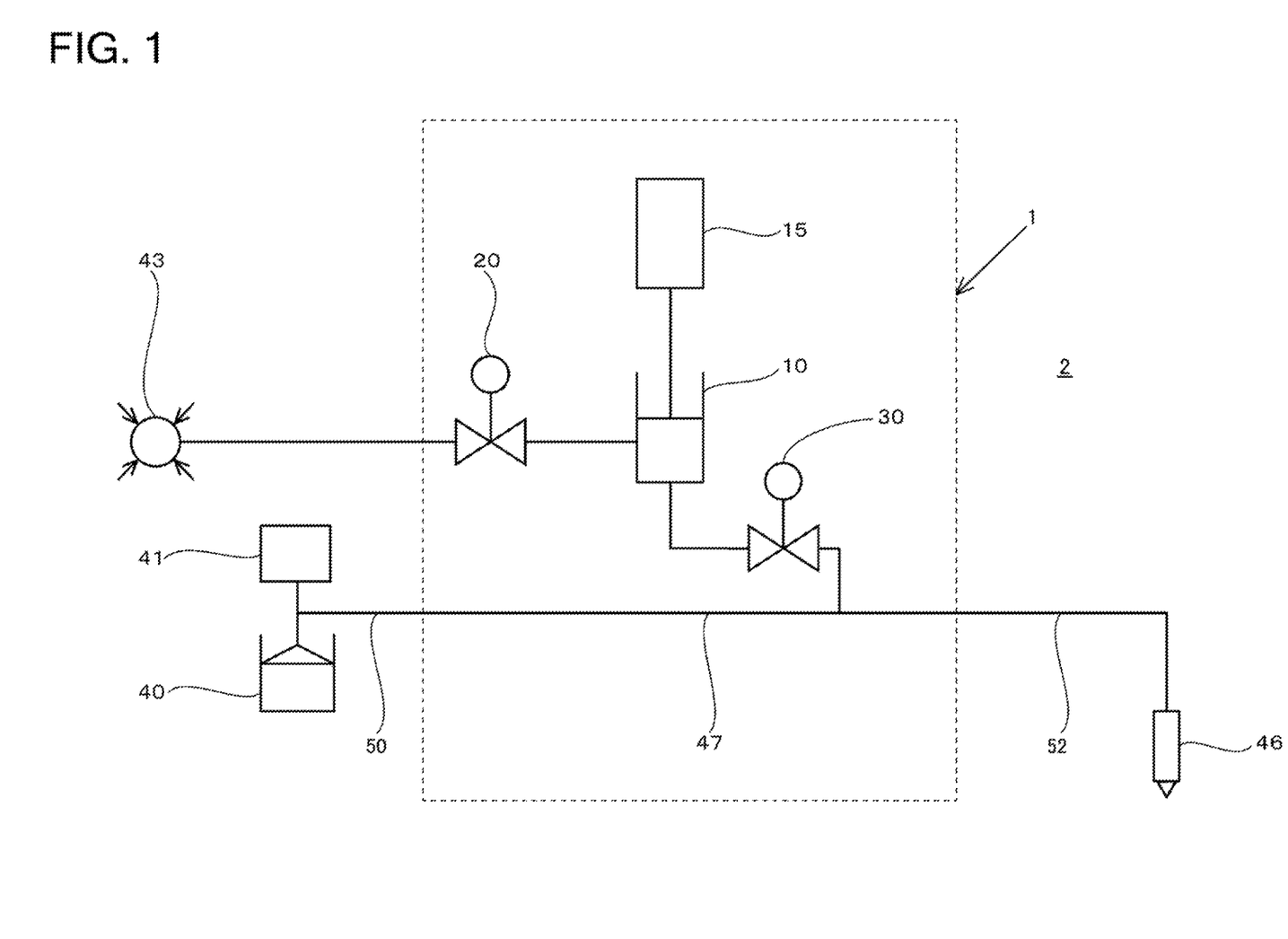
FIG. 1 is a circuit diagram of a gas mixing system including an apparatus for mixing gas into a high-viscosity material according to one embodiment of the present invention.
Figure 2:
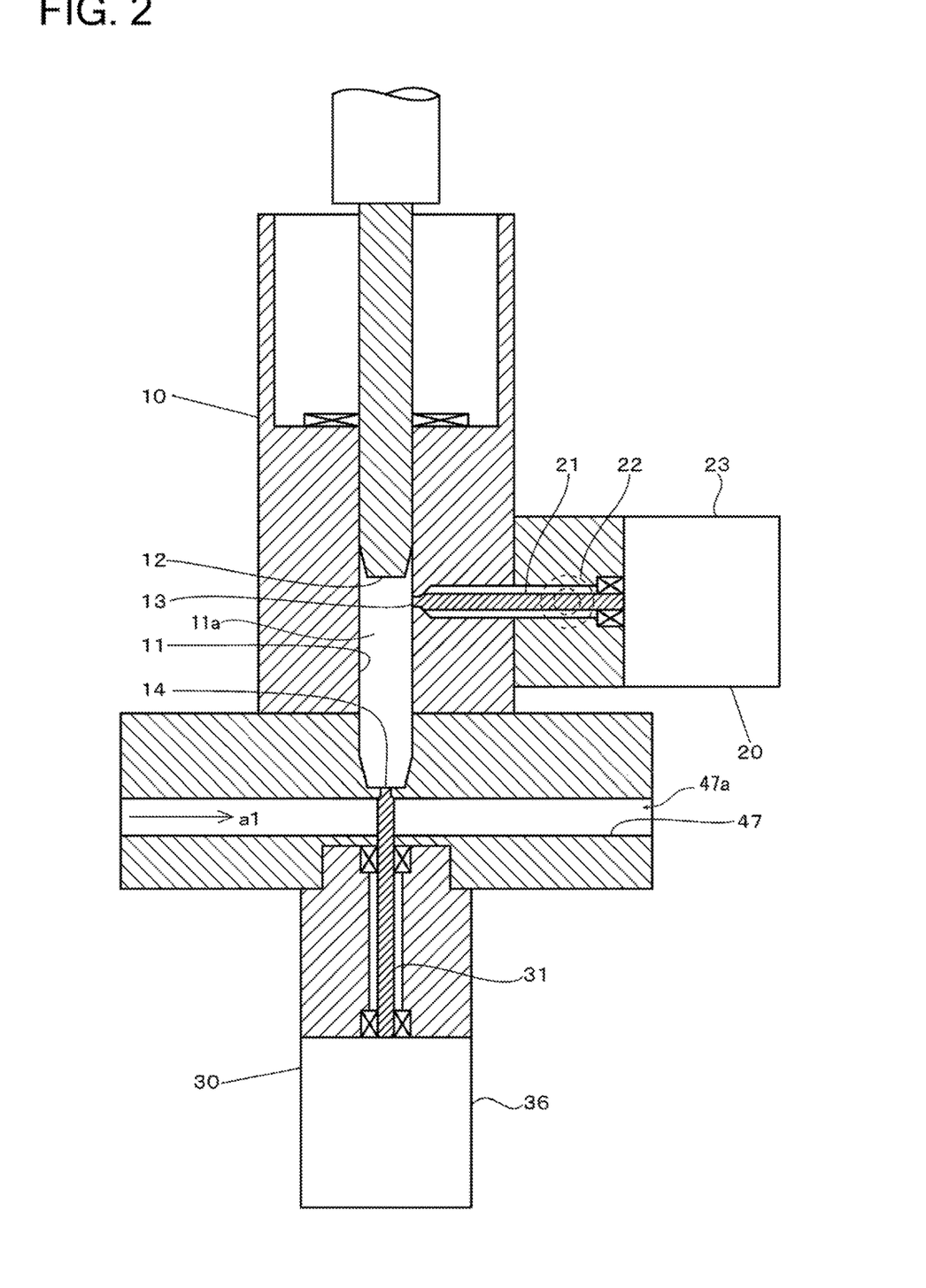
FIG. 2 is a cross-sectional view of the gas mixing apparatus according to the embodiment (a state where a piston is raised to a first position)

FIG. 1 is a circuit diagram for illustrating an apparatus 1 for mixing gas into a high-viscosity material according to one embodiment of the present invention, and FIG. 2 is a view illustrating a piston pump 10 included in the gas mixing apparatus 1.

As shown in FIG. 1, the apparatus 1 for mixing the gas into the high-viscosity material of the embodiment includes at least: the piston pump 10 for discharging the gas to conduit space (it is formed as a passage of the high-viscosity material formed by a conduit 47) through which the high-viscosity material flows; and a discharge valve 30 that controls gas supply from the piston pump 10 to the conduit 47. Further, the gas mixing apparatus 1 preferably includes: a drive part 15 that drives the piston pump 10; and a suction valve 20 that controls gas supply to the piston pump 10, and an example also including these configurations is shown in FIG. 1.

The gas mixing apparatus 1 can be incorporated in a gas mixing system 2 as one example shown in FIG. 1. The gas mixing system 2 includes: in addition to the gas mixing apparatus 1, a tank 40 that stores a high-viscosity material; a pressure pump 41 that pumps the high-viscosity material stored in the tank 40; a conduit 50 through which the high-viscosity material pumped from the pressure pump 41 is guided to the conduit 47; a gas compressor 43 that supplies the gas to the piston pump 10 through the suction valve 20; a conduit 52 through which the high-viscosity material into which the gas has been mixed flows, the high-viscosity material being sent from the conduit 47; and a nozzle 46 attached at a tip of a gun in order to discharge the high-viscosity material into which the gas has been mixed, the high-viscosity material being sent from the conduit 52.

The conduits 50, 47, and 52 may be configured as the different conduits, and they may be connected to each other using welding, flanges, etc. so that the high-viscosity material flows in these conduits in the above-described order. Naturally, the conduits 50, 47, and 52 may be configured as an integrated conduit from the beginning.

Although, for example, a well-known pail, drum, etc. may be used as the tank 40, the present invention is not limited to these. In addition, although various materials are considered as the high-viscosity material stored in the tank 40 and, for example, polyurethane, modified silicon, epoxy, silicone, acrylics, vulcanized rubber, plastisol such as PVC and acrylics, and a mixture thereof, and further, grease, edible cream, beauty cream, etc. are included, the present invention is not limited to these.

The pressure pump 41 may be anything as long as it can pump the high-viscosity material. As the pressure pump 41, although as a piston pump and a plunger pump for the pail or the drum, for example, rotary pumps, such as an air motor type double-action pump etc., and a gear pump and a screw pump in which pulsation at the time of pumping is not generated can also be employed, the present invention is not limited to these. In addition, a constant flow pump may be incorporated in the pressure pump 41 to thereby enable the high-viscosity material to be pumped at a constant flow rate.

Depending on viscosity of the high-viscosity material, a pressure at which the high-viscosity material is pumped is preferably 20 to 300 kg/cm$^2$, and is more preferably 50 to 200 kg/cm$^2$. This is because when the pressure at which the high-viscosity material is pumped becomes lower than 50 kg/cm$^2$, bubbles of the high-viscosity material might be coarse in the high-viscosity material being foamed, and because when it becomes lower than 20 kg/cm$^2$, a tendency for the bubbles to be coarse becomes more remarkable, and sizes of the bubbles might be non-uniform. In addition, this is because when the pressure becomes higher than 200 kg/cm$^2$, facilities cost high in order to secure pressurization performance and pressure-resisting performance of each component part of the apparatus, and because when it becomes higher than 300 kg/cm$^2$, a tendency for the facilities to cost high becomes more remarkable.

A discharge pressure of the high-viscosity material is 3 to 20 MPa, is preferably 5 to 12 MPa, and is more preferably 6 to 10 MPa, when a pressure value measured just in front of the nozzle 46 (just before discharge) is used.

In order to measure a flow rate of the pumped high-viscosity material, a flowmeter may be provided between the pressure pump 41 and the discharge valve 30 of the piston pump 10. A flowmeter and a constant flow device may be provided between the discharge valve 30 and the nozzle 46.

The gas compressor 43 can be, for example, configured as a compressor that supplies gas having a comparatively low-pressure of 0 to 1 MPa, 0 to 0.5 MPa, etc. As a type of gas, various gases, such as air (air of an atmospheric pressure, low-pressure air, and compressed air), carbon dioxide gas, nitrogen gas, oxygen, argon, and krypton, can be employed. In addition, although the gas compressor 43 can also be used in a case where air in the atmosphere is employed for the gas supplied to the high-viscosity material, instead of using it, an air intake port for taking in the air in the atmosphere may be provided, and the air of the atmospheric pressure introduced from the air intake port may be supplied to the piston pump 10. In this case, an air filter that filters the air and removes dust etc. may be provided between the air intake port and the suction valve 20. Further, a configuration including an adjusting valve etc. as a pressure adjusting mechanism that adjusts a gas tank and a gas pressure can be used instead of the gas compressor 43 or the air intake port. In addition, a pressure of the gas can be set to be a pressurized positive pressure higher than the atmospheric pressure or a negative pressure lower than the atmospheric pressure according to manufacturing conditions at that time.

A design in consideration of pressure-resisting safety becomes unnecessary by using the low-pressure gas. For example, it becomes possible to make component parts (a pipe, a valve, etc.) with materials having low strength, or to reduce thicknesses thereof. Further, control of a gas flow rate can be easily performed, and reliability of gas injection and handling safety can be improved. Hereby, reduction in weight and size of the whole gas mixing system can be achieved. Naturally, the present invention includes an aspect of handling a high-pressure gas according to intended use or a situation, and it is not limited to use of the low-pressure gas.

The nozzle 46 is the one for applying to a work piece the high-viscosity material into which the gas has been mixed, and can arbitrarily discharge the high-viscosity material. The nozzle 46 can be used by an arbitrary method, and may be, for example, either of a handheld nozzle and a nozzle attached to a tip of a manipulator.

As a method for supplying a mixture of the gas and the high-viscosity material to the nozzle 46, not to mention a mode that supplies to the nozzle 46 the mixture discharged from the one gas mixing apparatus 1, two or more gas mixing apparatuses 1 are arranged, they are parallelly or alternately operated, and thereby a supply amount of the mixture can be increased, or the mixture can be continuously supplied.

Further, a measuring device may be arranged between the gas mixing apparatus 1 (one gas mixing apparatus 1, or two or more gas mixing apparatuses 1 as described above) and the nozzle 46, and the high-viscosity material may be quantitatively provided to the nozzle 46 by the measuring device. In addition, two or more measuring cylinders may be arranged, and the high-viscosity material into which the gas has been mixed may be continuously provided to the nozzle 46 by alternate operation of the measuring cylinders.

In the high-viscosity material into which the gas is mixed by the piston pump 10, and that flows through the conduits 47 and 52 to reach the nozzle 46, the gas is dispersed and stirred in the high-viscosity material while flowing the conduits 47 and 52. In order to increase a distribution and stirring effect of the gas as described above, a mixer may be provided in a path of the conduit 47, or in the conduit 52 after the gas is mixed into the high-viscosity material by the piston pump 10. As the mixer, for example, a well-known mixer, such as a static mixer and a dynamic mixer, in which a plurality of spiral elements have been provided in series inside a pipe, may be employed.

Further, the gas mixing apparatus 1 may include a not-shown control unit that controls each component of the gas mixing apparatus 1. The control unit includes a CPU, a memory, or a relay, a timer, etc., is connected to the drive part 15, the suction valve 20, the discharge valve 30, the pressure pump 41, the flowmeter, the nozzle 46, etc., and makes operate the apparatus 1 for mixing the gas into the high-viscosity material in cooperation with the above-described components. For example, the control unit performs control of driving the piston pump 10 by one cycle, etc. each time when a predetermined amount of the high-viscosity material flows, based on a signal of the above-described flowmeter that detects a flow rate of the high-viscosity material.

Next, a detailed configuration of the piston pump 10 will be explained using FIG. 2.

As shown in FIG. 2, the piston pump 10 includes: a cylinder 11; a piston 12 configured to be slidable between a first position (for example, a top dead center) and a second position (for example, a bottom dead center) by the drive part 15 along an axial direction of the cylinder 11 in internal space of the cylinder 11; a suction port 13 for the gas provided in a side wall of the cylinder 11; and a discharge port 14 for the gas. The internal space of the cylinder 11 extends even to an inside of an outer peripheral portion of the conduit 47, and the discharge port 14 is formed near a passage of the high-viscosity material that is a termination of the internal space. The cylinder 11 forms a cylinder space having a predetermined volume defined by the piston 12, when the piston 12 is located at the first position (the top dead center).

In the piston 12, a tip of the piston 12 and an inside of an end of the cylinder 11 in which the discharge port 14 has been formed preferably fit to each other without a gap in an operation termination of a compression stroke of the piston 12 (the second position (the bottom dead center) of the piston 12). Here, "fitting without the gap" means that since the tip of the piston 12 has a shape complementary to the inside of the end of the cylinder 11 in which the discharge port 14 has been formed, the tip of the piston 12 can almost completely fit to the inside of the end of the cylinder 11 when the piston 12 is located at the second position (the bottom dead center). Hereby, dead space is eliminated in the cylinder, and a gas amount can be controlled more accurately. Alternatively, "fitting without the gap" also includes a way of fitting in which the "gap" is actually zero. For example, "fitting without the gap" means that when the tip of the piston 12 has the shape complementary to the inside of the end of the cylinder 11 in which the discharge port 14 has been formed, and the piston 12 is located at the second position (the bottom dead center), a distance between the tip of the piston 12 and the inside of the end of the cylinder 11 is 0 or is extremely small, and is not more than 2 mm, is preferably not more than 1 mm, and is more preferably not more than 0.5 mm.

The suction port 13 is provided in the side wall of the cylinder 11 of the piston pump 10. Preferably, the suction port 13 may just be provided near an operation termination of a suction stroke of the piston 12. When the piston 12 is located at the operation termination (the first position (for example, the top dead center)) of the suction stroke or near it, the suction port 13 is opened by the above-described suction valve 20, and the gas is introduced into the internal space of the cylinder 11 from the suction port 13. When the piston 12 starts the compression stroke, and reaches the vicinity of the operation termination (the bottom dead center), the discharge port 14 is opened by the above-described discharge valve 30, and the compressed gas is mixed into the high-viscosity material in the conduit 47 through the discharge port 14. Note that although the conduit 47 is formed integrally with component parts of the piston pump 10 near the piston pump 10, a well-known pipe, pressure hose, etc. are employed for portions connected to the other components, such as front and rear of the piston pump 10.

The suction valve 20 is provided on the side wall of the cylinder 11 of the piston pump 10 as shown also in FIG. 2, and opens and closes the suction port 13 of the piston pump 10. In the apparatus 1 for mixing the gas into the high-viscosity material of the embodiment, a needle valve is employed for the suction valve 20 as one example. The needle valve 20 includes: a needle shaft 21; a gas introduction port 22; and a drive part 23. The needle shaft 21 is preferably extends along a direction perpendicular to a shaft of the cylinder 11, and slides along the direction. The gas introduction port 22 is the one for introducing into the needle valve 20 the gas supplied from the gas compressor 43, and may be provided in a side surface of a housing of the needle valve 20.

The drive part 23 advances or retracts the needle shaft 21 along a longitudinal direction thereof. The needle shaft 21 can advance (move to a left side in FIG. 2) until a tip thereof fits in and closes the suction port. When the needle shaft 21 retracts (moves to a right side in FIG. 2) from a position where the needle shaft 21 fits in the suction port 13, the suction port 13 is opened, and the cylinder 11 and the gas introduction port 22 communicate with each other. Although a well-known air cylinder and electric motor can be used as the drive part 23, the present invention is not limited to this. In addition, a valve guide 21*a* for guiding the needle shaft 21 may be provided at a tip of the needle valve 20 of a suction port 13 side.

The discharge valve 30 is provided at the tip of the cylinder 11 of the piston pump 10, and opens and closes the discharge port 14 of the piston pump 10. In the apparatus 1 for mixing the gas into the high-viscosity material of the embodiment, a needle valve is employed for the discharge valve 30 as one example. The needle valve 30 is provided at a position opposed to the discharge port 14 of the piston pump 10 across a conduit space 47*a* formed by the conduit 47, and includes a needle shaft 31 and a drive part 36. The needle shaft 31 is provided coaxially with the shaft of the cylinder 11 so that a tip thereof passes through the conduit space 47*a* to fit in the discharge port 14.

The drive part 36 advances and retracts the needle shaft 31. The needle shaft 31 can advance (move to an upper side in FIG. 2) until the tip thereof fits in and closes the discharge port 14. At this time, when the needle shaft 31 retracts (moves to a lower side in FIG. 2) from a position where the needle shaft 31 fits in the discharge port 14, the discharge port 14 is opened, and the cylinder 11 and the conduit 47 communicate with each other. Although a well-known air cylinder and electric motor can be used as the drive part 36, the present invention is not limited to this. In addition, in the needle valve 30, a valve guide for guiding the needle shaft 31 may be provided in the conduit 47. Such a valve guide may be configured to include: a cylindrical body; a vertical hole through which the needle shaft 31 is made to vertically movably penetrate; and a horizontal hole that communicates with the conduit space 47a, and inside which the high-viscosity material is transferred.

Note that although the tips of the needle shafts 21 and 31 are schematically represented in FIG. 2, they can be formed as various shapes, such as a conical shape, a truncated cone, and a hemispherical shape in order to improve airtightness. In addition, the suction valve and the discharge valve are not limited to needle valves, and a valve having an arbitrary configuration can be used as long as it can open and close the suction port 13 and the discharge port 14. For example, a piston valve whose piston does not have a needle shape, a check valve, or a mechanism that opens and closes the suction port can also be employed.

Figure 3:
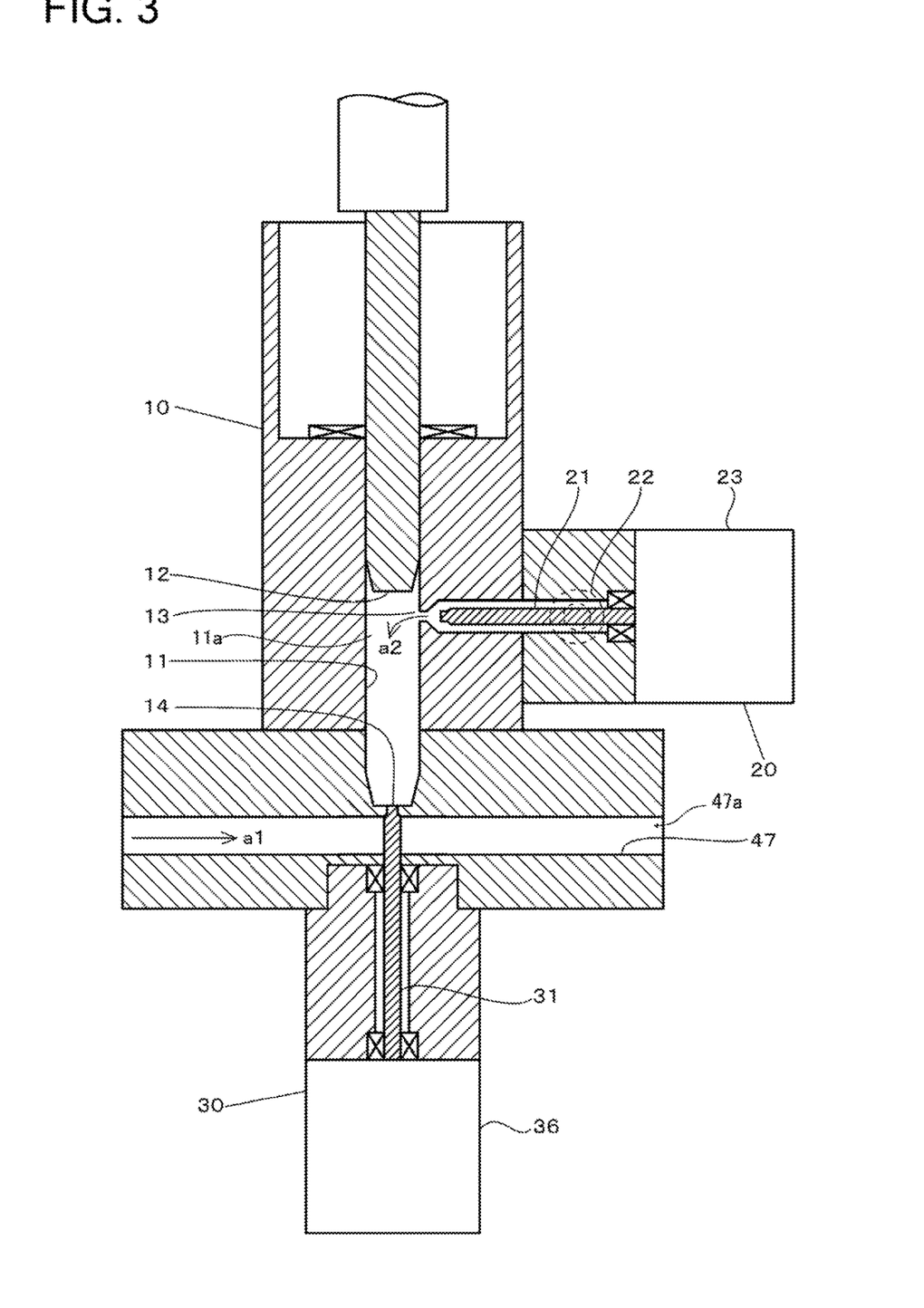
FIG. 3 is a cross-sectional view of the gas mixing apparatus according to the embodiment (a state where a suction valve is opened in the gas mixing apparatus of FIG. 2), and illustrates a step of making a piston pump suction gas.
Figure 4:
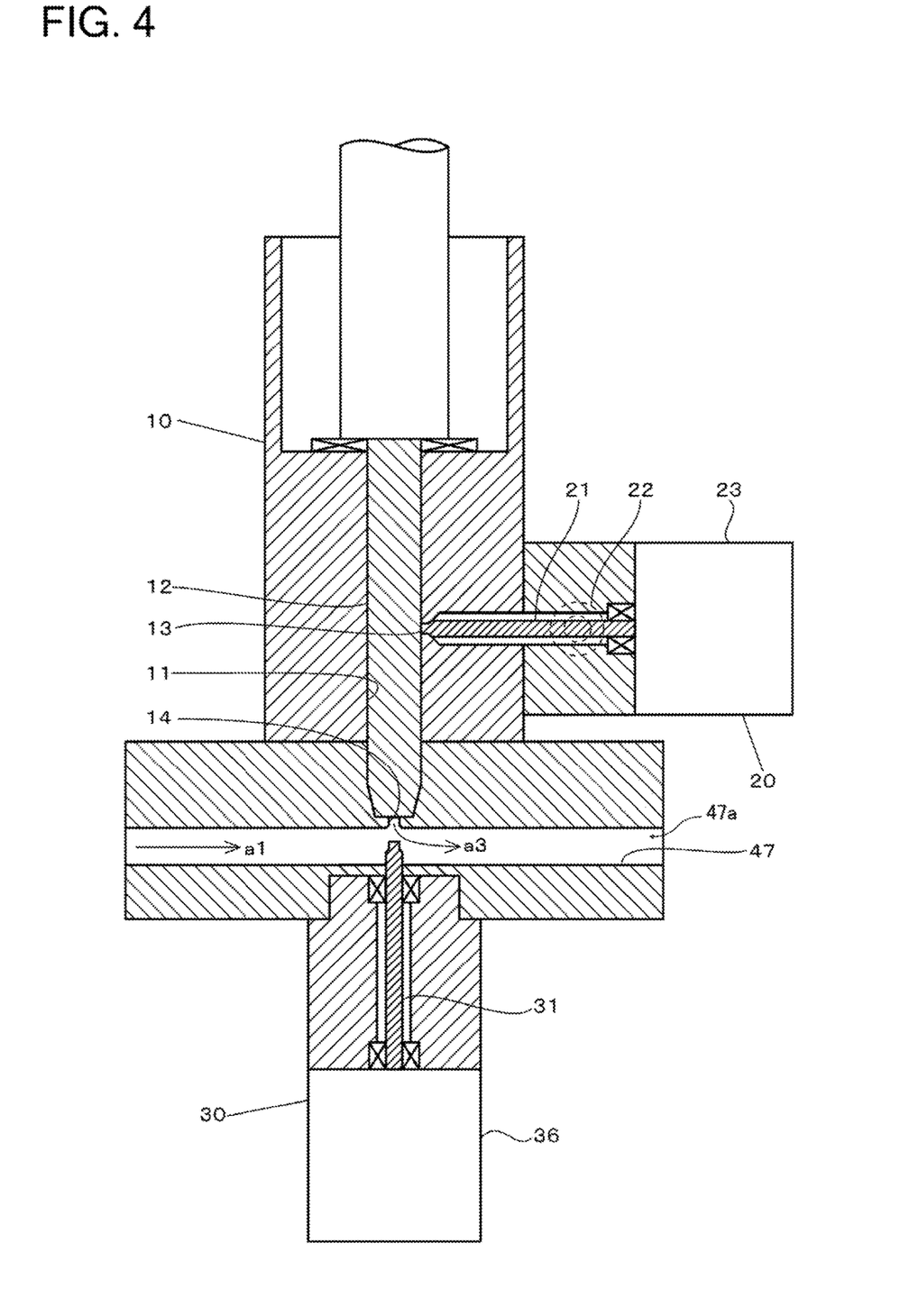
FIG. 4 is a cross-sectional view of the gas mixing apparatus according to the embodiment (a state where the suction valve is closed, the piston is lowered to a second position, and where a discharge valve is opened in the gas mixing apparatus of FIG. 2), and illustrates a step of mixing compressed gas generated by the piston pump into a high-viscosity material.

Next, operation of the apparatus 1 for mixing the gas into the high-viscosity material of the embodiment will be explained with reference to FIGS. 1 to 4 on the basis of a function of each component as explained above. FIGS. 1 and 2 are as already explained. FIG. 3 is a view illustrating a step of making the piston pump 10 suction gas, and FIG. 4 is a view illustrating a step of mixing the compressed gas generated by the piston pump 10 into the high-viscosity material.

First, the high-viscosity material is pumped from the tank 40 containing the high-viscosity material to a downstream side by the pressure pump 41 through the conduit 47. Note that in FIGS. 2 to 4, the high-viscosity material is assumed to be transferred from left toward right in the conduit 47 as shown in an arrow a1.

Note that, for example, one of the following methods is employed in the embodiment in order to monitor and determine whether or not a predetermined amount of the high-viscosity material has been transferred.
(1) The piston pump 10 is actuated interlocking with the pressure pump 41 including a quantification device.
(2) Suction of the pressure pump 41 whose capacity of one stroke is well-known (the capacity is decided) is counted, and the piston pump 10 is actuated.
(3) The piston pump 10 is actuated interlocking with a constant flow device and a discharge gun with constant flow installed separately from the pressure pump 41 and the piston pump 10 (change of a gas capacity of the cylinder is carried out by change and adjustment of a pressure of the gas, or a stroke of the piston).
(4) The piston pump 10 is actuated according to usage using a booster pump and a cylinder drive type discharge gun installed separately from the pressure pump 41 and the piston pump 10.
(5) Timing at which a predetermined amount of the high-viscosity material is transferred is determined based on a measured value of the flowmeter, and the piston pump 10 is actuated in accordance with the timing.

The gas mixing apparatus 1 is controlled so that one cycle of the piston pump 10 is executed each time when the predetermined amount of the high-viscosity material (the arrow a1 in FIGS. 2 to 4) flows. Note that the correspondence between the timing at which the predetermined amount of the high-viscosity material flows and time point of each operation of the piston pump 10 can be arbitrarily suitably changed, as long as one cycle of the piston pump 10 and a flow rate of the high-viscosity material can maintain a fixed relation. Hereinafter, one cycle of the piston pump 10 will be explained.

As shown in FIG. 2, the piston 12 moves to the operation termination of the suction stroke, i.e. from the second position to the first position, in a state where the suction valve 20 and the discharge valve 30 connected to the piston pump 10 are closed. At this time, although a cylinder space having a predetermined volume is formed in the cylinder 11, an inside of the cylinder 11 is a vacuum since the suction valve 20 and the discharge valve 30 are closed.

Next, the needle shaft 21 is retracted (moves to a right side in FIG. 3) by the drive part 23 of the suction valve 20 as shown in FIG. 3. The suction port 13 is then opened, the cylinder 11 and the gas introduction port 22 communicate with each other, and the gas before compression flows into the cylinder space having the predetermined volume in the cylinder 11 (an arrow a2 in FIG. 3). Subsequently, when the needle shaft 21 is advanced (moves to a left side in FIG. 3), and the suction valve 20 is closed, the inside of the cylinder 11 is filled with the gas, and the cylinder 11 becomes a state of being sealed. Namely, the suction valve 20 is opened for a predetermined time, and is closed at the time when a predetermined amount of the gas is stored in the cylinder 11. Next, operation of the piston 12 is stopped until the predetermined amount of the high-viscosity material flows.

Next, the piston 12 is moved to a compression stroke side, and the gas with which the cylinder 11 is filled is compressed. Namely, the piston is lowered from the first position to the second position. When the piston 12 reaches the vicinity of the operation termination (the bottom dead center) of the compression stroke, the discharge valve 30 is opened. Namely, the needle shaft 31 is retracted (moves to a lower side in FIG. 4) by the drive part 36 of the discharge valve 30, and the discharge port 14 is opened. As shown in FIG. 4, the compressed gas is then mixed into the high-viscosity material pumped in the conduit 47, and the piston 12 reaches the operation termination (the bottom dead center) of the compression stroke. Next, when the needle shaft 31 is advanced (moves to an upper side in FIG. 4), and the discharge valve 30 is closed, one cycle of mixing of the gas into the high-viscosity material is ended.

Note that the above-described vicinity of the operation termination of the piston 12 is preferably a piston position where the gas is compressed to $1/5$ to $1/100$, and is preferably a piston position where the gas is compressed to $1/10$ to $1/30$. At this time, in a case where a pressure of the material is higher than a pressure of the gas, the material flows backward from the discharge port 14 into the cylinder, the material is mixed with the gas in a gas cylinder. If the pressure of the material is much larger than the gas pressure, the material may change in quality by a shear force brought about by the discharge port 14 having a comparatively small diameter and an inflow velocity of the material. In addition, in a case where the gas pressure is much larger than the material pressure, the material does not flow into the cylinder, and thus mixability of the gas and the material may be deteriorated. Accordingly, mixability can be enhanced in a range where the material does not change in quality by properly adjusting the gas pressure and the material pressure.

Subsequently, when the predetermined amount of the high-viscosity material is transferred again, the above-described operation is repeated. Note that since the high-viscosity material pumped in the conduit 47 has a high pressure as already mentioned, mixed air is also compressed according to the pressure, and volume thereof is reduced. For this reason, even though the air is mixed into the high-viscosity material, it hardly affects the flow rate of the high-viscosity material, and pulsation etc. does not occur, either.

Next, the high-viscosity material into which the gas has been mixed is stirred while flowing through the conduits 47 and 52, hereby, bubbles of the mixed gas are made fine, and the fine bubbles are dispersed in the high-viscosity material. The high-viscosity material in which the fine bubbles have been dispersed is discharged from the nozzle 46, and is applied to a work piece etc. When the high-viscosity material is discharged from the nozzle 46, the high-viscosity material having the high pressure till then is located under an atmospheric pressure environment. In that case, the bubbles of the gas mixed into the high-viscosity material expand, and the high-viscosity material is foamed with a foam ratio according to an amount of the mixed gas. Note that a mixer may be used as needed in order to promote dispersion of the bubbles into the high-viscosity material.

As explained above, according to the apparatus for mixing the gas into the high-viscosity material, and the method for the same using the apparatus for mixing the gas into the high-viscosity material of the embodiment, since the piston pump is made to operate for each predetermined flow rate of the high-viscosity material, a ratio of mixing the gas into the high-viscosity material, i.e. the foam ratio of the high-viscosity material, can be freely changed by changing operation timing of the piston pump. For example, assuming that volume of the cylinder space 11a is 50 ml, and that the gas introduced into the cylinder 11 has the atmospheric pressure, if the piston pump is made to operate by one cycle each time when 50 ml of the high-viscosity material is transferred, the foam ratio becomes approximately twice. Similarly, if the piston pump is made to operate by one cycle each time when 100 ml of the high-viscosity material is transferred, the foam ratio becomes approximately one and a half times, and if the piston pump is made to operate by one cycle each time when 25 ml of the high-viscosity material is transferred, the foam ratio becomes approximately three times. It is needless to say that the above-described foam ratio can be changed also by changing the pressure of the gas introduced into the cylinder 11, or changing the volume of the cylinder space 11a. In order to change the volume of the cylinder space 11a, for example, operation of the piston 12 can be changed so as to change the first position of the piston 12.

Namely, in the example of the present invention, there is any one of next means, or a combination of the two or more means, as means for changing the foam ratio.
(1) Change of supply amount of high-viscosity material per one cycle of piston pump (Either speed of one cycle of piston pump or supply amount of high-viscosity material is changed, or both of them are changed)
(2) Change of pressure of gas introduced into cylinder space 11a
(3) Change of volume of cylinder space 11a (for example, change of first position of piston 12)

Particularly, in a conventional method for putting gas and a high-viscosity material in one piston pump together and then compressing them, when a foam ratio is tried to make lower than twice, it is necessary to make the gas with which an inside of the piston pump is filled have a negative pressure lower than the atmospheric pressure, and a configuration of the piston pump has been complicated since a negative-pressure tank etc. are added. In addition, when the foam ratio is tried to make higher than twice, it is necessary to increase the pressure of the gas with which the piston pump is previously filled, and a pressure tank etc. are needed similarly to the above. Additionally, when the pressure of the gas becomes high, the inside of the piston pump cannot be filled later with a prescribed amount of the high-viscosity material, and an error of the foam ratio occurs. Meanwhile, in the apparatus for mixing the gas into the high-viscosity material of the embodiment, only by increasing or decreasing the number of operations of the piston pump, not only the foam ratio can be easily changed, but the negative-pressure tank, the pressure tank, etc. become unnecessary, and thus, a configuration of the apparatus can be made simple.

Similarly, in the conventional method for putting the gas and the high-viscosity material in one piston pump together and then compressing them, a port from which the high-viscosity material is supplied or discharged cannot be made large in order not to increase dead space of the piston pump, a shear force is applied to the high-viscosity material at the time of passing through the port depending on a type of the high-viscosity material, and thus the high-viscosity material might change in quality. Meanwhile, in the apparatus for mixing the gas into the high-viscosity material of the embodiment, it is possible to previously compress the gas in the cylinder 11, and to reduce a pressure difference between the high-viscosity material and the gas. In that case, backflow of the high-viscosity material into the cylinder can be reduced, and there is nothing to worry about change in quality of the high-viscosity material. Note that as mentioned above, prevention of backflow of the high-viscosity material by compression of the gas is preferably performed in a range where mixability of the gas and the material is maintained good.

In addition, since the pressure pump that pumps the high-viscosity material, and the piston pump that compresses the gas have configurations independent from each other, operation of the piston pump does not affect the transfer of the high-viscosity material. Hereby, even with a configuration of including only a set of the pressure pump and the piston pump, and without providing a buffer tank, the high-viscosity material into which the gas has been mixed can be continuously sent, and further, sending of the high-viscosity material can also be stopped at arbitrary timing.

Similarly, since the pressure pump that pumps the high-viscosity material, and the piston pump that compresses the gas have the configurations independent from each other, and a mixing amount of the gas can be controlled only by increasing or decreasing the number of operations of the piston pump, the piston pump having the same volume can be used to some extent even though the flow rate of the high-viscosity material and a size of the pressure pump are changed.

In addition, since the high-viscosity material is not pumped in a multi-stage as in the conventional method, but is pumped with a predetermined pressure from the beginning, only one pressure pump that pumps the high-viscosity material is needed, and the configuration of the apparatus becomes simple.

In addition, in the other embodiment that uses gas other than the air having the atmospheric pressure as the gas mixed into the high-viscosity material, and includes a gas tank, an adjusting valve, etc., the foam ratio of the high-viscosity material can be changed by adjusting the pressure of the gas before compression supplied to the piston pump even though the operation timing of the piston pump is not changed. For example, in a case where the volume of the cylinder space 11a is 50 ml, and a pressure of the gas before compression supplied to the cylinder space 11a is 1 atmosphere, if the piston pump is made to operate by one cycle each time when 50 ml of the high-viscosity material is transferred, the foam ratio becomes approximately twice. However, the foam ratio becomes approximately three times by setting the pressure of the gas before compression supplied to the piston pump to be 2 atmospheres, and can be made approximately one and a half times by setting it to be 0.5 atmosphere.

Further, both a system that adjusts the gas mixing ratio to the above-mentioned high-viscosity material by changing the operation timing of the piston pump for each predetermined flow rate of the high-viscosity material, and a system that adjusts the gas mixing ratio to the high-viscosity material by adjusting the pressure of the gas before compression supplied to the piston pump are used, whereby a wide range amount of gas can be mixed to the high-viscosity material by the piston pump having the same volume, and whereby one piston pump can be made to widely deal with pressure pumps having various capacities.

Note that the above-mentioned apparatus for mixing the gas into the high-viscosity material and method for the same are exemplifications of the present invention, and that configurations thereof can be appropriately changed without departing from the spirit of the invention.

For example, in the gas mixing apparatus 1 shown in FIG. 2 etc., the conduit 47 is set to be one of configuration requirements, the cylinder space 11a extends even an inside of a side wall of the conduit 47, and the discharge port 14 is provided near the conduit space 47a. However, if the discharge port 14 can be provided near the conduit space 47a, there is no need to form the cylinder space 11a even the inside of the side wall of the conduit 47. As such a situation, a case is considered where the discharge port 14 can be arranged extremely near the conduit space 47a even if the side wall of the conduit 47 is extremely thin, and the discharge port 14 is provided outside the conduit 47 (only a hole for the discharge port 14 is formed in the conduit 47). In such a case, it becomes possible to eliminate the conduit 47 from the configuration requirements of the gas mixing apparatus 1 of the present invention. Namely, the gas mixing apparatus 1 of the present invention can be provided in an aspect in which the conduit 47 (or a part of the conduit) is not present.

In addition, the present invention is not limited to a disclosed positional relation between the cylinder 11 and the conduit 47 (the positional relation in which a longitudinal direction of the cylinder 11 is perpendicular to the conduit 47), and, for example, an aspect is also considered in which the cylinder 11 is arranged obliquely or parallelly to the conduit 47.

In addition, although the needle valves are used as the suction valve 20 and the discharge valve 30 in the above-described example, arbitrary types of valves, for example, gate-type valves etc. can also be used as long as they can open and close the cylinder space and the conduit space.

The operation timing is not limited to the disclosed example, either, and it becomes possible to make each configuration requirement operate at arbitrary timing as long as gas having predetermined volume and a predetermined pressure can be mixed into a predetermined amount of high-viscosity material.

Further, although in the above-described example, the suction valve 20 is used as the configuration requirement to open and close the suction port 13 of the gas mixing apparatus 1, the suction valve 20 can also be omitted as long as the cylinder space 11a can be filled with the gas in the present invention. For example, an aspect is also considered in which gas having a predetermined pressure is introduced from not-shown gas supply means into the cylinder space 11a without a valve through the suction port.

Further, although in the above-described example, the method for mixing the gas into the high-viscosity material of the present invention is executed by the gas mixing system 2 including the gas mixing apparatus 1 disclosed as the example of the present invention, the method of the present invention is not limited to the example using the disclosed gas mixing apparatus 1 and system 2. For example, means for opening and closing the suction port 13 and the discharge port 14 can be an opening and closing configuration other than the disclosed suction valve 20 and discharge valve 30. In addition, the positional relation between the cylinder 11 and the conduit 47 can also be arbitrarily and suitably changed as mentioned above.

REFERENCE SIGNS LIST

1 Apparatus for mixing gas into high-viscosity material
10 Piston pump
11 Cylinder
11a Cylinder space
12 Piston
13 Suction port
14 Discharge port
15 Drive part
20 Suction valve (Needle valve)
21 Needle shaft
22 Gas introduction port
23 Drive part
30 Discharge valve (Needle valve)
31 Needle shaft
36 Drive part
40 Tank
41 Pressure pump
42 Flowmeter
43 Air intake port
44 Air filter
45 Mixer
46 Nozzle
47 Conduit
47a Conduit space

The invention claimed is:
1. A gas mixing apparatus for mixing gas into a high viscosity material, the gas mixing apparatus comprising:
a piston pump including a cylinder, a discharge port for gas formed at an end of the cylinder so as to make the cylinder communicate with a conduit through which a high-viscosity material can flow, a suction port formed in the cylinder so as to fill the cylinder with gas, and a piston slidable between a first position and a second position inside the cylinder;
a discharge valve that opens and closes the discharge port, wherein the cylinder forms a cylinder space having a predetermined volume for filled gas when the piston is located at the first position; and
a controller,
the controller being configured to control the apparatus to execute each of the steps of:
closing the discharge valve;
moving the piston to the first position to form the cylinder space having the predetermined volume;

filling the cylinder space with the gas having the predetermined pressure from the suction port;

moving the piston toward the second position to compress the gas; and opening the discharge valve to mix the compressed gas into the high-viscosity material that flows through the conduit.

2. The gas mixing apparatus according to claim 1, wherein the series of steps from closing the discharge valve to opening the discharge valve is repeated each time when a predetermined amount of the high-viscosity material flows.

3. The gas mixing apparatus according to claim 2, wherein a foam ratio of the high-viscosity material is controlled by adjusting at least any one of the predetermined amount of the high-viscosity material, the predetermined volume of the cylinder space, and the predetermined pressure of the gas.

4. The gas mixing apparatus according to claim 1, wherein when the piston is located at the second position, a tip of the piston fits to an inside of the end of the cylinder.

5. The gas mixing apparatus according to claim 4, wherein the tip of the piston has a shape complementary to the inside of the end of the cylinder in which the discharge port has been formed.

6. The gas mixing apparatus according to claim 1, wherein the discharge port is provided so as to face a flow of the high-viscosity material in a side wall of the conduit, and wherein the discharge valve includes a valve body that can extend from a position of the side wall of the conduit, and can seat at the discharge port, the position being opposed to the discharge port.

7. The gas mixing apparatus according to claim 6, wherein the valve body is a needle.

8. The gas mixing apparatus according to claim 1, further comprising a suction valve that opens and closes the suction port, wherein the suction port is provided in a side wall of the cylinder that forms the cylinder space, and wherein the suction valve includes a valve body that can extend from an outside of the cylinder space, and can seat at the suction port.

* * * * *